(12) United States Patent
Nonomura et al.

(10) Patent No.: US 9,695,815 B2
(45) Date of Patent: Jul. 4, 2017

(54) PUMP DEVICE AND METHOD FOR CONTROLLING THE SAME

(75) Inventors: Yuji Nonomura, Saito (JP); Sachie Suzuki, Saito (JP); Ryuji Itoyama, Saito (JP); Akhiro Yamanaka, Saito (JP)

(73) Assignee: Ulvac Kiko, Inc., Miyazaki (JP)

( * ) Notice: Subject to any disclaimer, the term of this patent is extended or adjusted under 35 U.S.C. 154(b) by 338 days.

(21) Appl. No.: 14/378,743

(22) PCT Filed: Feb. 16, 2012

(86) PCT No.: PCT/JP2012/001022
§ 371 (c)(1),
(2), (4) Date: Aug. 14, 2014

(87) PCT Pub. No.: WO2013/121462
PCT Pub. Date: Aug. 22, 2013

(65) Prior Publication Data
US 2016/0003251 A1 Jan. 7, 2016

(51) Int. Cl.
*F04B 49/20* (2006.01)
*F04B 43/02* (2006.01)
(Continued)

(52) U.S. Cl.
CPC ............ *F04B 49/20* (2013.01); *F04B 43/021* (2013.01); *F04B 43/04* (2013.01); *F04B 45/04* (2013.01);
(Continued)

(58) Field of Classification Search
None
See application file for complete search history.

(56) References Cited

U.S. PATENT DOCUMENTS 4,563,134 A * 1/1986 Hitzelberger ......... F04B 49/225
417/295
5,520,517 A * 5/1996 Sipin ....................... F04B 49/06
417/44.11
(Continued)

FOREIGN PATENT DOCUMENTS

JP   2005251694 A   9/2005
JP   2007234443 A   9/2007
(Continued)

OTHER PUBLICATIONS

PCT/JP2012/001022 International Search Report dated Feb. 16, 2012.

*Primary Examiner* — Charles Freay
*Assistant Examiner* — Kenneth J Hansen
(74) *Attorney, Agent, or Firm* — McNees Wallace & Nurick LLC

(57) ABSTRACT

A pump device and method for stabilizing a suction flow rate irrespective of an outside air temperature. The method includes: outputting a drive signal for driving a motor at a rotation speed for discharging gas of the reference flow rate from the suction port of the pump main body; measuring a temperature of gas discharged from the suction port or a temperature of the pump main body by a temperature sensor attached to the pump main body; calculating an actual flow rate of the gas discharged from the suction port based on a temperature signal relating to the temperature of the gas included in an output of the temperature sensor; and correcting the drive signal such that the actual flow rate equals the reference flow rate and outputting the corrected drive signal to the motor.

11 Claims, 14 Drawing Sheets

(51) Int. Cl.
  *F04B 43/04*  (2006.01)
  *F04B 45/04*  (2006.01)
  *F04B 45/047*  (2006.01)
  *F04B 49/06*  (2006.01)
  *F04B 49/10*  (2006.01)
  *F04B 53/10*  (2006.01)

(52) U.S. Cl.
  CPC ............ *F04B 45/047* (2013.01); *F04B 49/06* (2013.01); *F04B 49/103* (2013.01); *F04B 53/10* (2013.01); *F04B 53/1065* (2013.01); *F04B 2203/0209* (2013.01)

(56) References Cited

U.S. PATENT DOCUMENTS

| | | | |
|---|---|---|---|
| 6,267,568 B1* | 7/2001 | Pagnon | F04B 43/06 417/403 |
| 2005/0123408 A1* | 6/2005 | Koehl | F04D 15/0088 417/53 |
| 2010/0021313 A1* | 1/2010 | Devan | F04B 17/03 417/44.1 |

FOREIGN PATENT DOCUMENTS

| JP | 2009047084 A | 3/2009 |
|---|---|---|
| JP | 2012117435 A | 6/2012 |

* cited by examiner

PUMP DEVICE AND METHOD FOR CONTROLLING THE SAME

TECHNICAL FIELD

The present invention relates to a pump device used as, for example, a booster blower or booster pump and to a control method therefor.

BACKGROUND ART

There are widely known a pump device called booster blower or booster pump as a device that boosts gas such as fuel gas and oxygen to a desired pressure. A roots pump, a diaphragm pump, or the like is used for the pump device of this type. For example, Patent Document 1 below describes a diaphragm pump used as a booster blower for fuel gas in a fuel cell system.

In the case where the pump device is used in the fuel cell system, as a general method, a flow rate detector is provided on a suction side of the pump in order to stabilize the flow rate and a detection signal of this flow rate detector is used to control a motor of the pump. However, the flow rate detector takes high cost. In addition, a correct flow rate cannot be detected due to the influence of pulsation during low-flow rate operation, and hence the operation of the pump cannot be stably controlled.

In view of this, Patent Document 2 describes a fuel cell system in which an outside air temperature is detected and the rotation speed of the pump is corrected based on the detected temperature. With this, it is possible to control the operation of the blower without using the flow rate detector.

Patent Document 1: Japanese Patent Application Laid-open No. 2009-047084
Patent Document 2: Japanese Patent Application Laid-open No. 2007-234443

SUMMARY OF INVENTION

Problem to be Solved by the Invention

However, in the suction flow rate control of the pump based on the outside air temperature, the inventors have found from experiments that, when the motor rotation speed is kept and the outside air temperature is changed, the suction flow rate largely varies depending on an amount of change in temperature (time rate of change). Thus, the pump operation control based on the outside air temperature has a problem that it is difficult to stabilize the suction flow rate with high reproducibility.

In view of the above-mentioned circumstances, it is an object of the present invention to provide a pump device capable of stabilizing a suction flow rate irrespective of an outside air temperature and a control method therefor.

Means for Solving the Problem

In order to achieve the object, a pump device according to an embodiment of the present invention includes a pump main body, a temperature sensor, and a controller.

The pump main body includes a discharge port, a suction port, a pump chamber, a movable member, and a drive unit. The pump chamber is communicable with each of the discharge port and the suction port. The movable member alternately suctions gas into the pump chamber and discharges gas from the pump chamber. The drive unit includes a motor that drives the movable member and is capable of changing a flow rate of gas discharged from the suction port according to a rotation speed.

The temperature sensor is attached to the pump main body and measures a temperature of gas discharged from the suction port or a temperature of the pump main body, to thereby output a temperature signal relating to a temperature of the gas.

The controller includes an input unit, an arithmetic unit, and an output unit. The input unit into which an external signal for specifying a reference flow rate of the gas discharged from the suction port is input. The arithmetic unit calculates, based on the temperature signal, an actual flow rate of the gas discharged from the suction port. The output unit outputs a correction signal for correcting a rotation speed of the motor such that the actual flow rate equals the reference flow rate.

Further, a control method for a pump device according to an embodiment of the present invention includes outputting a drive signal for driving a motor at a rotation speed for discharging gas of the reference flow rate from the suction port of the pump main body.

A temperature of gas discharged from the suction port or a temperature of the pump main body is measured by a temperature sensor attached to the pump main body.

An actual flow rate of the gas discharged from the suction port is calculated based on a temperature signal relating to the temperature of the gas included in an output of the temperature sensor.

The reference rotation speed is corrected such that the actual flow rate equals the reference flow rate and a corrected rotation speed signal is output to the motor.

BRIEF DESCRIPTION OF DRAWINGS

FIGS. 18A and 18B Main-part longitudinal cross-sectional views each showing a configuration of a suction valve of the pump device, in which FIG. 18A shows a state during stop of the pump and FIG. 18B shows a state during operation of the pump.

MODE(S) FOR CARRYING OUT THE INVENTION

Figure 1:
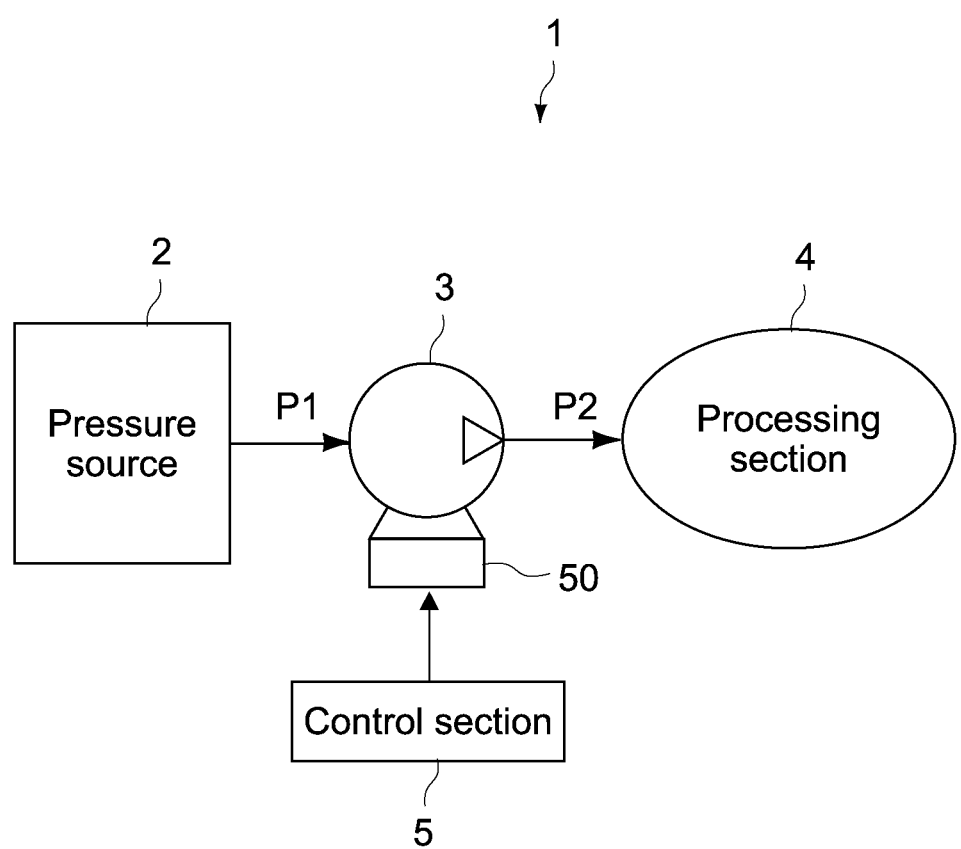
FIG. 1 A schematic view of a pump system to which a pump device according to an embodiment of the present invention is applied.

A pump device according to an embodiment of the present invention includes a pump main body, a temperature sensor, and a controller.

The pump main body includes a discharge port, a suction port, a pump chamber, a movable member, and a drive unit. The pump chamber is communicable with each of the discharge port and the suction port. The movable member alternately suctions gas into the pump chamber and discharges gas from the pump chamber. The drive unit includes a motor that drives the movable member and is capable of changing a flow rate of gas discharged from the suction port according to a rotation speed.

The temperature sensor is attached to the pump main body and measures a temperature of gas discharged from the suction port or a temperature of the pump main body, to thereby output a temperature signal relating to a temperature of the gas.

The controller includes an input unit, an arithmetic unit, and an output unit. The input unit into which an external signal for specifying a reference flow rate of the gas discharged from the suction port is input. The arithmetic unit calculates, based on the temperature signal, an actual flow rate of the gas discharged from the suction port. The output unit outputs a correction signal for correcting a rotation speed of the motor such that the actual flow rate equals the reference flow rate.

In the pump device, the movable member periodically changes the volume of the pump chamber, to thereby alternately suction gas into the pump chamber and discharge gas from the pump chamber. The kind of gas is not particularly limited and various kinds of gas such as oxygen and hydrocarbon-based gas are applicable according to the purpose of use. The gas introduced from the discharge port into the pump chamber is boosted by the movable member in the pump chamber and discharged from the suction port. The movable member is driven by the motor and the flow rate of the discharged gas is controlled based on the rotation speed or r.p.m. of the motor. By repeating the above-mentioned operations, gas having a predetermined pressure from the suction port is discharged at a predetermined flow rate.

The controller drives the motor at the rotation speed at which the gas at the reference flow rate is discharged from the suction port. The flow rate of the gas discharged from the suction port has a temperature dependency. The density decreases as the temperature increases, for example, and hence the flow rate decreases. Therefore, the controller measures the temperature of the gas discharged from the suction port by the temperature sensor attached to the pump main body. Based on the measurement value, the actual flow rate is calculated. Then, the rotation speed of the motor is corrected such that the calculated actual flow rate equals the reference flow rate and the motor is driven at the corrected rotation speed.

In the pump device, the driving rotation speed of the motor is corrected based on the temperature of the suction gas. Thus, in comparison with the case where the driving rotation speed of the motor is corrected based on the atmospheric temperature or the outside air temperature, it is possible to stably control the suction flow rate of the gas with high accuracy irrespective of the amount of change in outside air temperature.

The temperature sensor outputs the temperature signal relating to the temperature of the suction gas. The temperature sensor is not limited to the case where the temperature of the gas discharged from the suction port is directly measured. A temperature of a particular site of the pump main body may be measured and the measurement value may be considered as the temperature of the gas. That is, it has been confirmed that the temperature of the gas discharged from the pump main body has a higher correlation with the temperature of the pump main body than the outside air temperature and it is possible to realize the flow rate control of the suction gas with high reproducibility even if the temperature of the pump main body is considered as the gas temperature (pseudo-temperature). With this, the degree of freedom in the attachment position of the temperature sensor is increased and it is possible to know the gas temperature without prohibiting the flow of the gas.

As an embodiment, the temperature sensor is attached to the motor. The temperature of the pump main body often depends on a heating temperature of the motor, and hence the pseudo-temperature of the gas can be obtained by, for example, measuring a temperature of or near the surface of the motor. Alternatively, the temperature sensor may be placed in the pump chamber. With this configuration, the temperature of the gas in the pump chamber can be obtained, and hence a high-accurate flow rate control can be performed.

The controller may further include a storage unit. The storage unit stores a correction coefficient including a temperature characteristic of the pump main body, which are obtained in advance. In this case, the arithmetic unit calculates an actual flow rate of the gas by multiplying the correction coefficient with a gas flow rate calculated based on the temperature signal.

By performing a correction in view of the temperature characteristic of the pump main body, it is possible to control the flow rate of the gas discharged from the pump main body with higher accuracy.

The temperature characteristic of the pump main body includes, for example, a change in suction flow rate due to a thermal change of the pump main body or a component thereof. The correction coefficient may further include a change of the pump main body or the component thereof over time, a variation of the individual difference of the pump main body, and the like.

The correction coefficient may be an approximation function of the temperature characteristic from a first temperature to a second temperature higher than the first temperature. In this case, the approximation function is used to generate a correction signal for increasing the rotation speed of the motor between the first temperature and a third temperature higher than the first temperature and lower than the second temperature.

With this, it is possible to make the flow rate characteristics of the gas between the first temperature and the third temperature corresponding to the flow rate characteristics of the gas between the third temperature and the second temperature. It is possible to provide a linear correlation between the flow rate and the rotation speed from the first temperature to the second temperature.

The pump device may further include a first valve, a second valve, and a third valve.

The first valve is attached between the discharge port and the pump chamber and permits a flow of gas from the discharge port to the pump chamber.

The second valve is attached between the pump chamber and the suction port and permits a flow of the gas from the pump chamber to the suction port when the pressure of gas in the pump chamber is a first pressure or higher.

The third valve is attached to the pump main body and limits a flow of the gas from the discharge port to the suction port when the pressure of gas between the discharge port and the suction port is equal to or lower than a second pressure higher than the first pressure.

With the pump device, even if gas having a pressure equal to or higher than the first pressure and equal to or lower than the second pressure is introduced into the pump chamber from the discharge port upon stop of an operation, for example, the flow of the gas is prohibited by the third valve and the gas discharged from the suction port is limited. With this, careless discharging of the gas during the stop of operation is suppressed.

The second pressure can be appropriately set. The second pressure is set based on, for example, a pressure of the gas introduced into the discharge port or an allowable flow rate of the gas discharged in the operation stop state. "To limit the flow" means both "to block the flow" and "not to block the flow but to reduce the flow rate."

A control method for a pump device according to an embodiment of the present invention includes outputting a drive signal for driving a motor at a rotation speed for discharging gas of the reference flow rate from the suction port of the pump main body.

A temperature of gas discharged from the suction port or a temperature of the pump main body is measured by a temperature sensor attached to the pump main body.

An actual flow rate of the gas discharged from the suction port is calculated based on a temperature signal relating to the temperature of the gas included in an output of the temperature sensor.

The reference rotation speed is corrected such that the actual flow rate equals the reference flow rate and a corrected rotation speed signal is output to the motor.

In the control method for the pump device, the driving rotation speed of the motor is corrected based on the temperature of the suction gas. Based on the atmospheric temperature or the outside air temperature, in comparison with the case where the driving rotation speed of the motor is corrected, it is possible to stably control the suction flow rate of the gas with high accuracy irrespective of the amount of change in outside air temperature.

Hereinafter, embodiments of the present invention will be described with reference to the drawings.

First Embodiment

FIG. 1 is a view showing a pump system according to a first embodiment of the present invention. A pump system 1 according to this embodiment includes a pressure source 2, a pump device 3, a processing section 4, and a control section 5.

The pressure source 2 is connected to a discharge side (primary side) of the pump device 3. The processing section 4 is connected to a suction side (secondary side) of the pump device 3. The pressure source 2 may be a container such as a tank and a cylinder that contains fluid having a predetermined pressure or may be a pressure generation source such as a compressor. The pump device 3 functions as a booster blower or booster pump that increases a pressure P1 of fluid, which is introduced from the pressure source 2, to a predetermined pressure P2 and supplies it to the processing section 4 at a predetermined flow rate (throughput). The processing section 4 processes the fluid supplied from the pump device 3 and generates an energy, a power, or the like. The control section 5 controls the entire system including the pump device 3 and the processing section 4.

The pump system 1 is applied to, for example, a fuel cell system. In this case, the pressure source 2 corresponds to a fuel tank and the pump device 3 boosts fuel gas (e.g., city gas (methane), LPG (liquefied propane gas)) and supplies it to the processing section 4. The processing section 4 includes a reformer that converts the fuel gas to hydrogen, a fuel cell that stores hydrogen, a power generator that causes hydrogen and oxygen to react, and the like.

[Pump Device]

Figure 2:
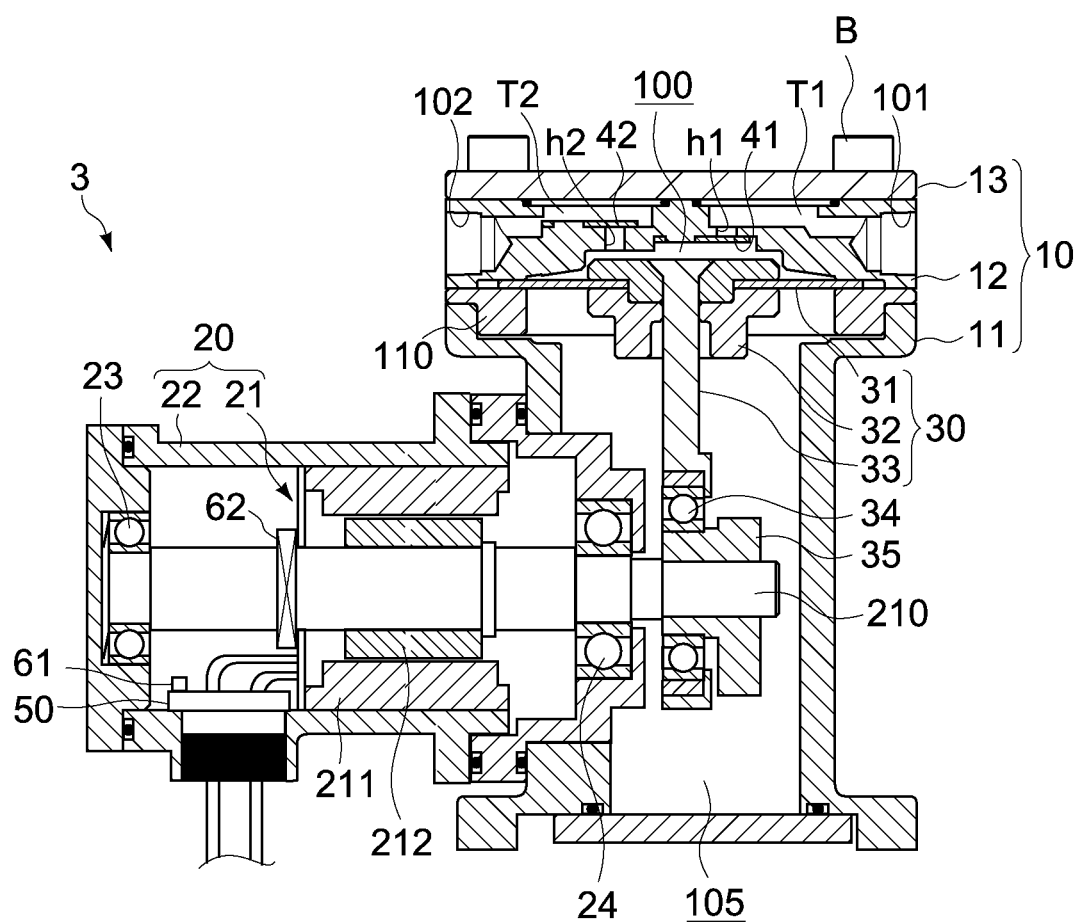
FIG. 2 A longitudinal cross-sectional view showing a configuration of the pump device.

Next, the pump device 3 will be described in details with reference to FIG. 2. FIG. 2 is a cross-sectional view showing a structure of the pump device 3. In this embodiment, the pump device 3 is constituted of a diaphragm pump.

(Pump Main Body)

The pump device 3 includes a metal casing 10, a drive unit 20, a movable member 30, and a controller 50. The casing 10, the drive unit 20, and the movable member 30 constitute a pump main body of the pump device 3. Although, in this embodiment, the controller 50 is mounted on the pump main body, the controller 50 is not limited thereto and may be provided outside the pump main body.

The casing 10 includes a pump main body 11, a pump head 12, and a pump head cover 13. The drive unit 20 includes a motor 21 and a motor case 22.

The pump main body 11 forms, inside the casing 10, an operating space 105 for housing the movable member 30. The movable member 30 includes a diaphragm 31, a fixture 32 fixed to the diaphragm 31, and a connecting rod 33 that couples the fixture 32 to the motor 21.

The diaphragm 31 is formed of a disk-shaped rubber material. The diaphragm 31 is, at a circumference thereof, sandwiched between the pump main body 11 and the pump head 12. The fixture 32 is fixed to a middle portion of the diaphragm 31. The fixture 32 is constituted of a plurality of parts assembled to sandwich the diaphragm 31 from above and below. The connecting rod 33 is integrated with the fixture 32 to extend through a center portion of the diaphragm 31. The connecting rod 33 is coupled via a bearing 34 to a circumferential surface of an eccentric cam 35 mounted on rotating shaft 210 of the motor 21.

The pump head 12 includes a discharge port 101 and a suction port 102. The pump head 12 is disposed on an upper surface of an annular seat 110. The seat 110 is mounted on an upper open end portion of the pump main body 11. The seat 110 sandwiches the circumference of the diaphragm 31 with the pump head 12. The pump head 12 forms a pump chamber 100 between the pump head 12 and the diaphragm 31.

The pump head 12 includes a discharge passage T1 that provides a communication between the discharge port 101 and the pump chamber 100 and a suction passage T2 that provides a communication between the pump chamber 100 and the suction port 102. The pump chamber 100 can communicate with the discharge port 101 and the suction port 102 through the discharge passage T1 and the suction passage T2, respectively. A discharge valve 41 (first valve) and a suction valve 42 (second valve) are attached to the discharge passage T1 and the suction passage T2, respectively.

The discharge valve 41 is attached to the pump head 12 to close a discharge hole h1 forming the discharge passage T1. The discharge valve 41 includes a reed valve attached to an end portion of the discharge hole h1 facing the pump chamber 100 and permits a flow of fluid from the discharge port 101 to the pump chamber 100. A valve-opening pressure of the discharge valve 41 (minimum pressure necessary to open the discharge valve 41) is not particularly limited and only needs to be a valve-opening pressure which ensures that gas at a predetermined flow rate is introduced into the pump chamber 100 in operation of the pump device.

On the other hand, the suction valve 42 is attached to the pump head 12 to close a suction hole h2 forming the suction passage T2. The suction valve 42 includes a reed valve attached to an end portion of the suction hole h2 on an opposite side of the pump chamber 100 and permits a flow of fluid from the pump chamber 100 to the suction port 102. A valve-opening pressure of the suction valve 42 (minimum pressure necessary to open the suction valve 42) is not particularly limited. The valve-opening pressure of the suction valve 42 is set to a pressure such that a desired suction pressure can be obtained. In this embodiment, the valve-opening pressure of the suction valve 42 is set to a pressure (first pressure) higher than the valve-opening pressure of the discharge valve 41.

The pump head cover 13 is mounted on an upper portion of the pump head 12. The discharge passage T1 and the suction passage T2 are formed by assembling the pump head 12 and the pump head cover 13 together. The pump main body 11, the pump head 12, and the pump head cover 13 are integrally fixed with a plurality of screw members B.

The motor 21 is constituted of a direct-current brush-less motor that enables a rotation speed control to be performed. The motor 21 is housed in the motor case 22 having a cylindrical shape. The motor 21 includes the rotating shaft 210, a stator 211, and a rotor 212. The stator 211 is fixed to an inner surface of the motor case 22 and the rotor 212 is fixed around the rotating shaft 210. The rotating shaft 210 is supported by the motor case 22 via bearings 23 and 24. A leading end of the rotating shaft 210 is fitted into a center of rotation of the eccentric cam 35.

The eccentric cam 35 is formed such that the center of rotation is eccentric with respect to an inner race of the bearing 34. Therefore, when the rotating shaft 210 is rotated around an axis thereof by driving the motor 21, the eccentric cam 35 is rotated together with the rotating shaft 210, such that the movable member 30 reciprocates up and down within the operating space 105. With this, the volume of the pump chamber 100 is periodically changed and a predetermined pump function can be provided. An amount of reciprocation (amount of stroke) of the movable member 30 depends on an amount of eccentricity of the eccentric cam 35.

(Controller)

The controller 50 is provided within the motor case 22 of the drive unit 20. The controller 50 includes various electronic parts such as an IC chip and is constituted of a wiring board electrically connected to the control section 5 and the motor 21. The controller 50 drives the motor 21 in response to a control signal (Vsp) input from the control section 5.

In general, a suction flow rate (NL/min) of gas of the diaphragm pump linearly changes due to a change in rotation speed of the motor. Therefore, in the case where the temperature of the gas is fixed, it is possible to obtain a stable flow rate by controlling the rotation speed of the motor. The control signal (Vsp) specifies a motor rotation speed (hereinafter, referred to as reference rotation speed) for obtaining a flow rate (hereinafter, referred to as reference flow rate) calculated based on a gas density at a reference temperature (20° C.). The reference rotation speed is adjusted by a voltage value of the control signal (Vsp).

However, there is a problem that, when the temperature of the atmosphere changes, the flow rate is changed even if the control signal (Vsp) is not changed. For example, as the temperature increases, the gas density decreases according to the Boyle Charle's law. The diaphragm pump has a structure of suctioning and compressing gas having a certain volume. Thus, as the density of the suctioned gas decreases, the suction flow rate decreases. Therefore, for obtaining a desired flow rate, the rotation speed (rotation per minute (r.p.m.)) of the motor has to be increased.

As a solution of such a phenomenon, a method of detecting an atmospheric temperature and changing an offset value of the control signal (Vsp) according to this temperature is known. However, it has been established from experiments that, in this method, a gas temperature does not follow the atmospheric temperature depending on the speed of change in temperature of the atmosphere and it is difficult to perform a stable flow rate control (FIG. 3).

In view of this, the pump device 3 according to this embodiment includes a temperature sensor 61 that measures a temperature of the drive unit 20. Although the temperature sensor 61 is placed on the controller 50, the temperature sensor 61 is not limited thereto and may be directly attached to the motor case 22 or the like. The temperature sensor 61 measures the temperature of the drive unit 20 and outputs the measurement result to the controller 50. A temperature-measuring element such as a thermistor and a thermocouple is used for the temperature sensor 61.

A measurement target of the temperature sensor 61 is an internal temperature of the motor case 22, that is, a temperature of the motor 21. The casing 10 of the pump device 3 is made of metal and a temperature of the casing 10 is influenced by the temperature of the motor 21. By the way, gas suctioned from the discharge port 101 and discharged from the suction port 102 receives a heat from the casing 10. Therefore, the temperature of the gas discharged from the suction port 102 can be considered as the temperature of the casing 10. The temperature sensor 61 according to this embodiment measures the temperature of the drive unit 20 in this manner, to thereby output a temperature signal relating to the temperature of the discharged gas.

Figure 3:
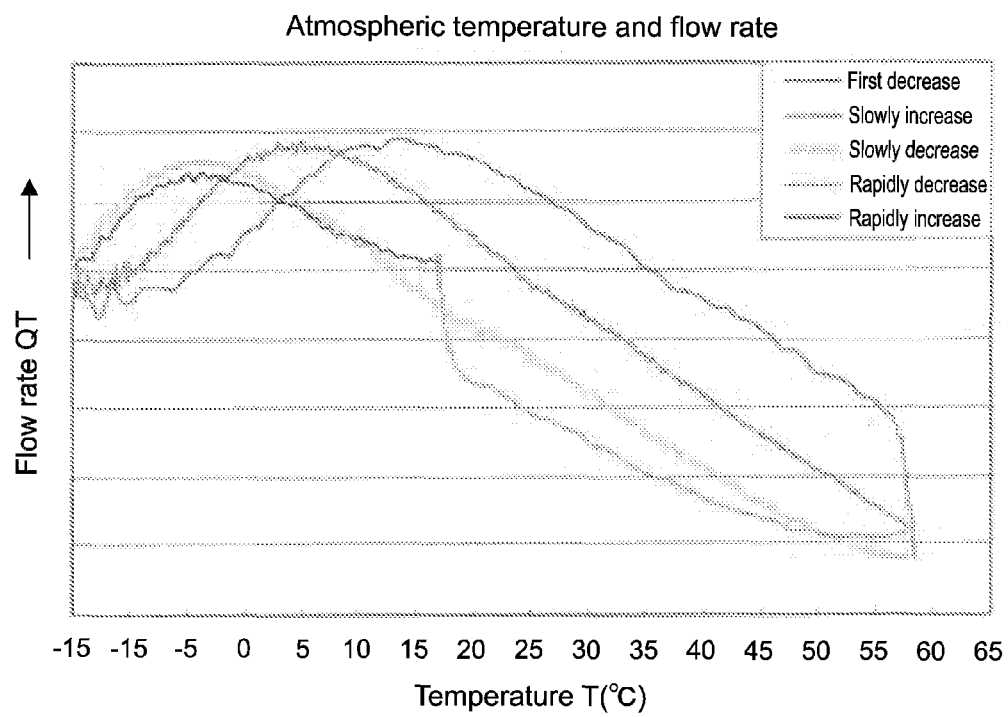
FIG. 3 An experimental result showing a change in flow rate when the pump is operated by a rotation speed control based on the atmospheric temperature.

FIG. 3 shows a relationship between the atmospheric temperature and the suction flow rate of the gas when the atmospheric temperature is changed at different speeds. In the experiment, the rotation speed of the motor was kept. A change in flow rate when the atmospheric temperature is slowly increased and decreased from −15° C. to 75° C. and a change in flow rate when the atmospheric temperature is increased and decreased rapidly (3 h) are shown. The flow rate is calculated using a density change expression (Expression (1)) below.

$$Q_T = Q_{T0}(273+T_0)/(273+T) \quad (1)$$

Where $Q_T$ indicates a flow rate [NL/min] at a temperature T, $Q_{T0}$ indicates a flow rate [NL/min] at a reference temperature $T_0$, T indicates an atmospheric temperature [° C.], and $T_0$ indicates a reference temperature (20° C.)

As shown in FIG. 3, in a method of calculating a suction flow rate according to the atmospheric temperature, the flow rate is largely varied due to a speed of change in atmospheric temperature. In this case, the flow rate according to the change in temperature cannot be obtained with high reproducibility and a stable flow rate control cannot be performed.

Figure 4:
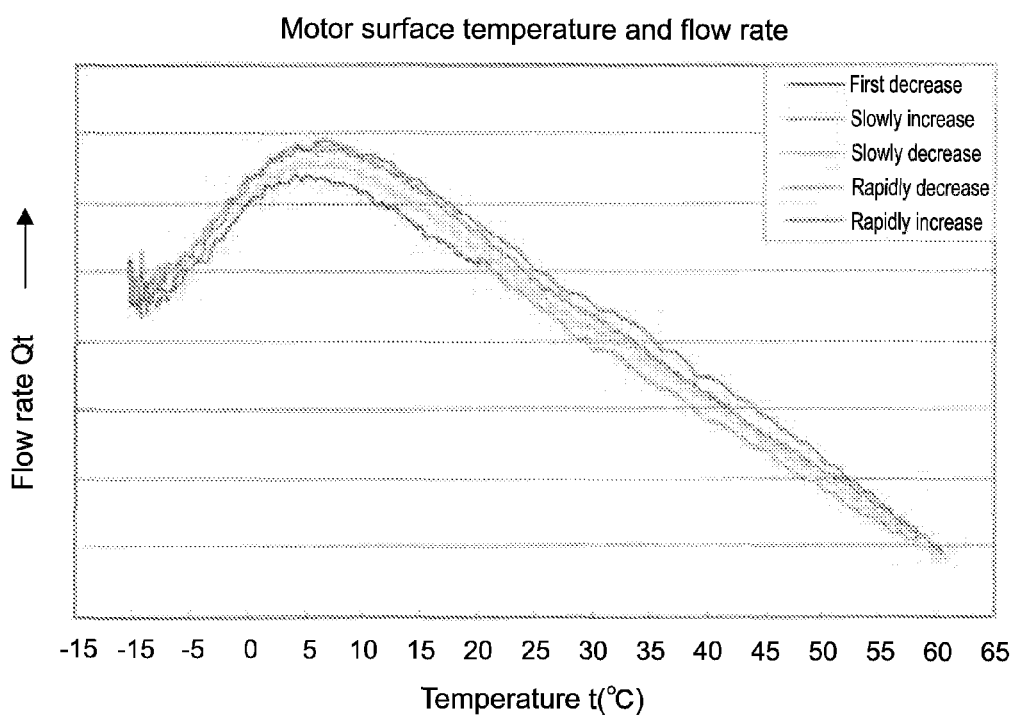
FIG. 4 An experimental result showing a change in flow rate when the pump is operated by a rotation speed control based on a motor surface temperature.

On the other hand, FIG. 4 shows a relationship between the surface temperature of the motor and the suction flow rate of the gas when the atmospheric temperature is changed at different speeds. The motor rotation speed and the change in speed of the atmospheric temperature are the same as those in the experiment shown in FIG. 3. The flow rate is calculated using a density change expression (Expression (2)) below.

$$Q_T = Q_{T0}(273+T_0)/(273+t) \quad (2)$$

Where $Q_T$ indicates a flow rate [NL/min] at a temperature t, $Q_{T0}$ indicates a flow rate [NL/min] at a reference temperature $T_0$, t indicates a motor surface temperature [° C.], and $T_0$ indicates a reference temperature (20° C.).

As shown in FIG. 4, according to the method of calculating the suction flow rate according to the surface temperature of the motor, it is possible to obtain the gas flow rate with high reproducibility irrespective of the speed of change in atmospheric temperature. This result indicates that the correlation of the change in flow rate with the motor surface temperature is higher than the correlation of the change in flow rate with the change in atmospheric temperature. Thus, by controlling the drive of the motor based on the motor surface temperature, it is possible to stably operate the pump at a desired suction flow rate.

Figure 5:
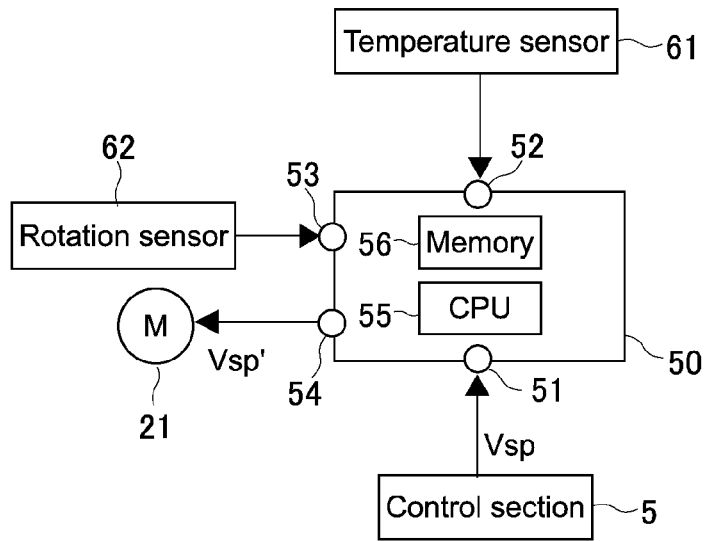
FIG. 5 A block diagram showing a configuration of main parts of the pump device.

FIG. 5 is a block diagram showing a configuration of the controller 50.

The controller 50 includes a first input terminal 51, a second input terminal 52, a third input terminal 53, and an output unit 54. The control signal (Vsp) is input from an outside (control section 5) into the first input terminal 51. An output signal from the temperature sensor 61 is input into the second input terminal 52. An output signal from a rotation sensor 62 is input into the third input terminal 53. The output unit 54 outputs a drive signal to the motor 21.

The controller 50 drives the motor 21 in response to a control signal (Vsp) and causes the gas at the reference flow rate corresponding to the control signal (Vsp) to be discharged from the suction port 102. The controller 50 monitors, based on the output of the rotation sensor 62, the rotation speed of the motor 21. The rotation sensor 62 is attached to an inside of the motor case 22 and measures a rotation speed of the rotating shaft 210 of the motor 21. For example, a rotary encoder is used for the rotation sensor 62.

The controller 50 further includes a CPU 55 (arithmetic unit) that calculates the suction flow rate of the gas based on the output of the temperature sensor 61 according to the Expression (2) and a memory 56 (storage unit) that stores an appropriate correction coefficient. The CPU 55 calculates the actual flow rate of the gas discharged from the suction port 102 based on the output of the temperature sensor 61. Then, a correction signal for correcting the rotation speed of the motor 21 is generated such that the calculated actual flow rate equals the reference flow rate and the correction signal is output as a drive signal (Vsp').

The CPU 55 may be constituted of one chip or may be constituted of a plurality of chips. The controller 50 can be constituted of, for example, a micro processor for control and a driver IC that drives the motor 21.

[Operation of Pump Device]

Figure 6:
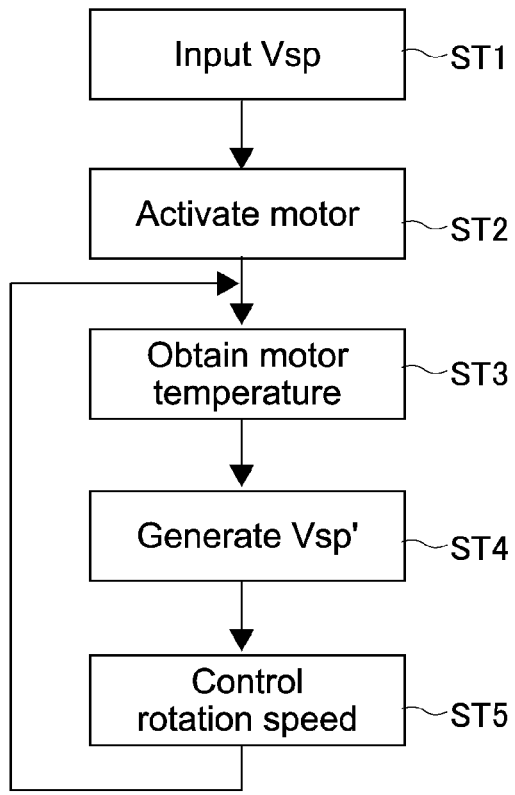
FIG. 6 A flowchart explaining a control method for the pump device.

Next, a typical operation example of the thus configured pump device 3 will be described. FIG. 6 is a control flow of the pump device 3.

By receiving a control signal (Vsp) from the control section 5, the pump device 3 activates the motor 21 at a reference rotation speed (Steps 1 and 2). The control section 5 normally starts the pump system 1 by keeping the suction flow rate of the fuel gas supplied from the pump device 3 to the processing section 4 at a reference flow rate corresponding to the reference rotation speed.

The motor 21 rotates the eccentric cam 35 via the rotating shaft 210 and reciprocates the movable member 30 in the operating space 105 at a predetermined stroke. With this, the diaphragm 31 comparting the pump chamber 100 moves up and down such that the volume of the pump chamber 100 periodically changes.

The movable member 30 periodically changes the volume of the pump chamber 100 and alternately suctions gas into the pump chamber 100 and discharges gas from the pump chamber 100. That is, fuel gas having a pressure P1 (e.g., 2 kPa (gage pressure)) is introduced into the pump chamber 100 via the discharge valve 41 from the pressure source 2 connected to the discharge port 101. The fuel gas introduced into the pump chamber 100 is compressed and boosted by the movable member in the pump chamber 100, such that the suction valve 42 is opened. By repeating the above-mentioned operations, fuel gas having a pressure P2 (e.g., 15 kPa (gage pressure)) is discharged from the suction port 102 to the processing section 4.

At the start of the pump device 3, the controller 50 outputs the control signal (Vsp) to the motor 21 as a drive signal. The control signal (Vsp) is a rotation speed-specifying signal with a flow rate calculated based on a gas density at the reference temperature (20° C.) being a reference. When the temperature of the gas discharged from the suction port 102 equals the reference temperature, the gas is discharged at a suction flow rate (reference flow rate) corresponding to the rotation speed (reference rotation speed) specified by the control signal (Vsp).

On the other hand, if the gas temperature does not equal the reference temperature, the suction flow rate is changed due to the temperature difference therebetween as shown in FIG. 4. Therefore, the controller 50 obtains a surface temperature of the motor 21 from the temperature sensor 61 in order to calculate an actual suction flow rate (Step 3). As described above, the surface temperature of the motor 21 has a high correlation with a change in flow rate of the gas, and hence, in this embodiment, a flow rate (actual flow rate) of actually discharged gas is calculated considering the motor surface temperature as the gas temperature. For the calculation of the actual flow rate, Expression (2) above is used. Then, the controller 50 generates a correction signal (Vsp') in which the rotation speed of the motor 21 is corrected such that the calculated actual flow rate equals the reference flow rate, and drives the motor at the corrected rotation speed (Steps 4 and 5).

The controller 50 repeats Steps 3 to 5, to thereby keep the suction flow rate of the pump device 3 at the reference flow rate. Note that, when the control signal (Vsp) is changed, Steps 1 to 5 are performed by the same processing as described above.

Figure 7:
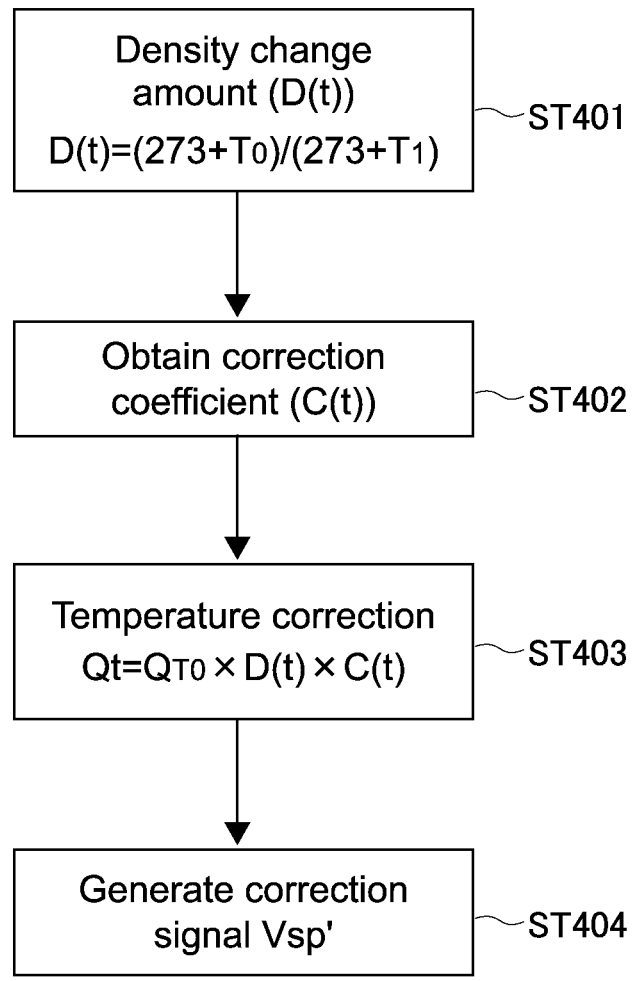
FIG. 7 A main-part flowchart explaining the control method for the pump device.

FIG. 7 is a flow of processes showing details of the generation of the correction signal (Vsp').

In the generation of the correction signal (Vsp'), the CPU 55 of the controller 50 calculates, based on a motor surface temperature (t) detected based on the output of the temperature sensor 61, a density change amount D(t) according to Expression (2) above (Step 401). Next, the CPU 55 obtains, from the memory 56, a correction coefficient C(t) corresponding to the temperature t (Step 402). Subsequently, the CPU 55 calculates a reference flow rate (actual flow rate) $Q_T$ in which the temperature is corrected, by multiplying a reference flow rate ($Q_{T0}$) by each of the density change amount D(t) and the correction coefficient C(t) (Step 403). Then, the CPU 55 compares the rotation speed of the motor 21, which is obtained from the rotation sensor 62, with the rotation speed corresponding to an actual flow rate $Q_T$ and generates a correction signal (Vsp') for making the actual flow rate $Q_T$ equal to the reference flow rate $Q_{T0}$ (Step 404).

The correction coefficient C(t) serves to correct a change in suction flow rate due to temperature characteristics of the pump main body. The temperature characteristics include thermal deformation of the casing 10, deterioration of the diaphragm 31 over time, thermal characteristics of the motor 21, and the like. In the calculation of the actual flow rate $Q_T$, the multiplication by the correction coefficient C(t) is not necessarily essential. Nevertheless, by the multiplication by the correction coefficient C(t), it is possible to operate the pump at a stable flow rate in low- and high-temperature regions.

Figure 8:
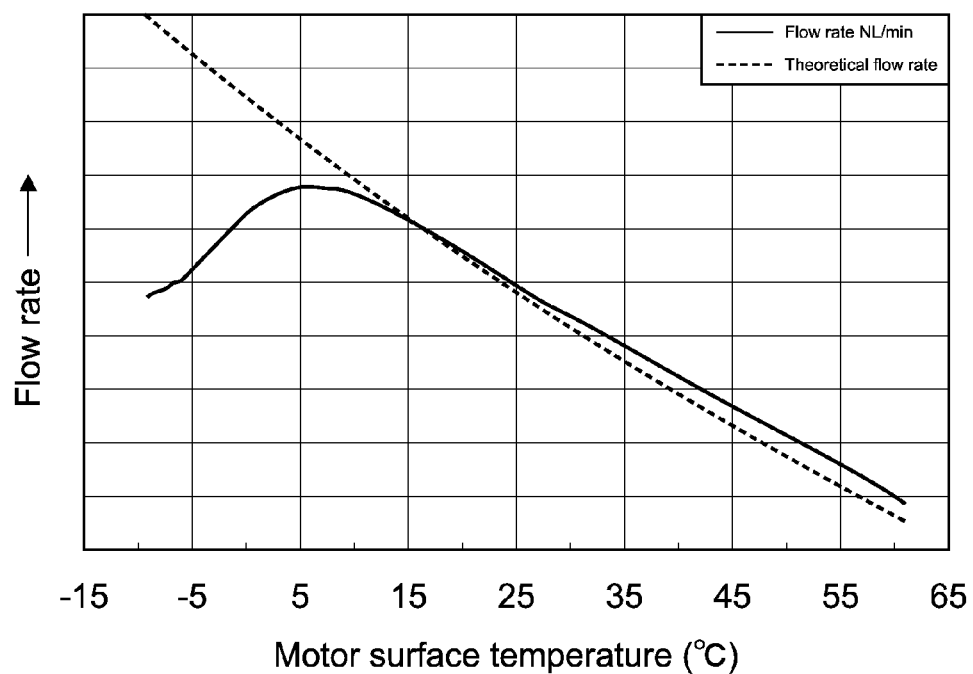
FIG. 8 An experimental result explaining actions of the pump device.
Figure 9:
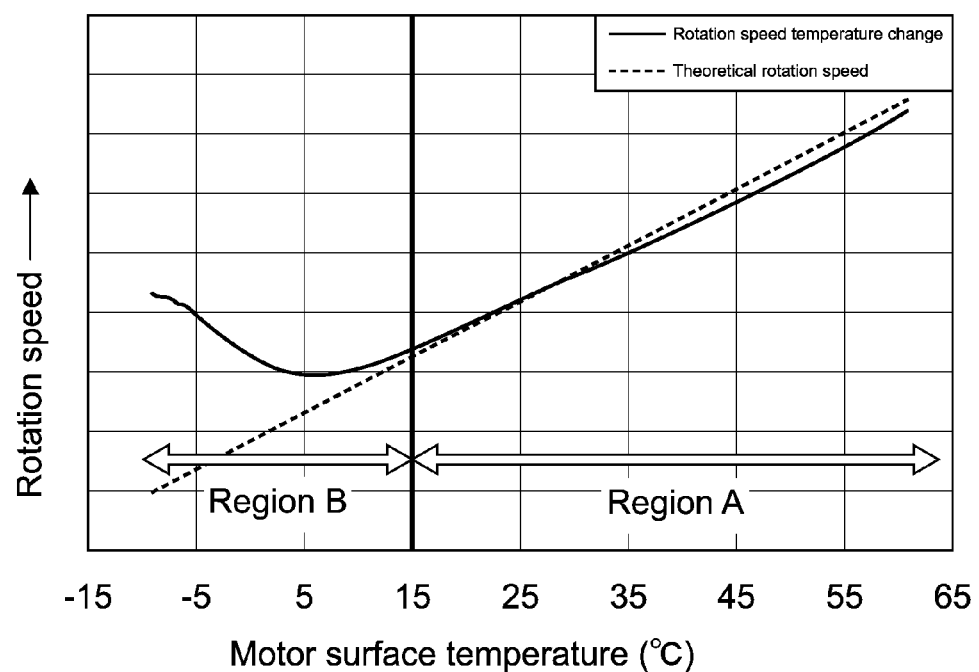
FIG. 9 An experimental result explaining the actions of the pump device.

Atmospheric temperature dependency of the suction flow rate and the motor rotation speed when the pump device is operated according to a correction signal generated based on $Q_T = Q_{T0} * D(t)$ without using the correction coefficient C(t) is shown in FIGS. 8 and 9.

FIG. 8 shows a change in flow rate when the motor rotation speed is fixed and the atmospheric temperature is changed from −15° C. to 75° C. A horizontal axis of the graph indicates a motor surface temperature. A flow rate indicated by a vertical axis refers to a measurement value (arbitrary unit) of a flowmeter installed on the suction side of the pump. For the sake of comparison, a theological flow rate calculated according to the density change expression (Expression (2)) is shown by a broken line. On the other hand, FIG. 9 shows a change in motor rotation speed when the suction flow rate is fixed and the atmospheric temperature is changed from −15° C. to 75° C. By inputting a value of the flowmeter, the rotation speed of the motor is controlled such that the flow rate is fixed. The broken line in the figure shows a theological rotation speed for obtaining the flow rate that is calculated according to the density change expression (Expression (2)).

It can be seen from FIGS. 8 and 9 that, in a temperature region (region A) of 15° C. or more and 60° C. or less, the suction flow rate of the pump and the motor rotation speed almost equal to the theological values and the flow rate control with high reproducibility can be realized without using the correction coefficient C(t). In contrast, in a temperature region (region B) of −10° C. or more and 15° C. or less, the suction flow rate and the motor rotation speed deviate from the theological values and the deviation from the theological values tends to increase as the temperature is lowered.

A cause why the temperature correction of the flow rate according to the density change amount D(t) deviates from the theological value in the region B is strongly linked with temperature characteristics of the pump main body (casing 10, drive unit 20, and movable member 30). The temperature characteristics include, for example, elastic deformation of rubber parts such as the discharge valve 41, the suction valve 42, and the diaphragm 31 due to a change in temperature, temperature characteristics of the motor 21 itself, and further, temperature characteristics of semiconductor parts constituting the temperature sensor 61 and the controller 50.

In this embodiment, these temperature characteristics of the pump main body are obtained in advance and the correction coefficient C(t) is determined as a temperature function. Then, as shown in Expression (3) below, the actual flow rate ($Q_T$) is calculated by multiplying the reference flow rate ($Q_{T0}$) by the correction coefficient C(t) and the density change amount D(t).

$$Q_T = Q_{T0} * C(t) * D(t) \tag{3}$$

With this, not only in the high-temperature region A but also in low-temperature region B, it is possible to perform a rotation control of the motor according to the theological value.

Figure 10:
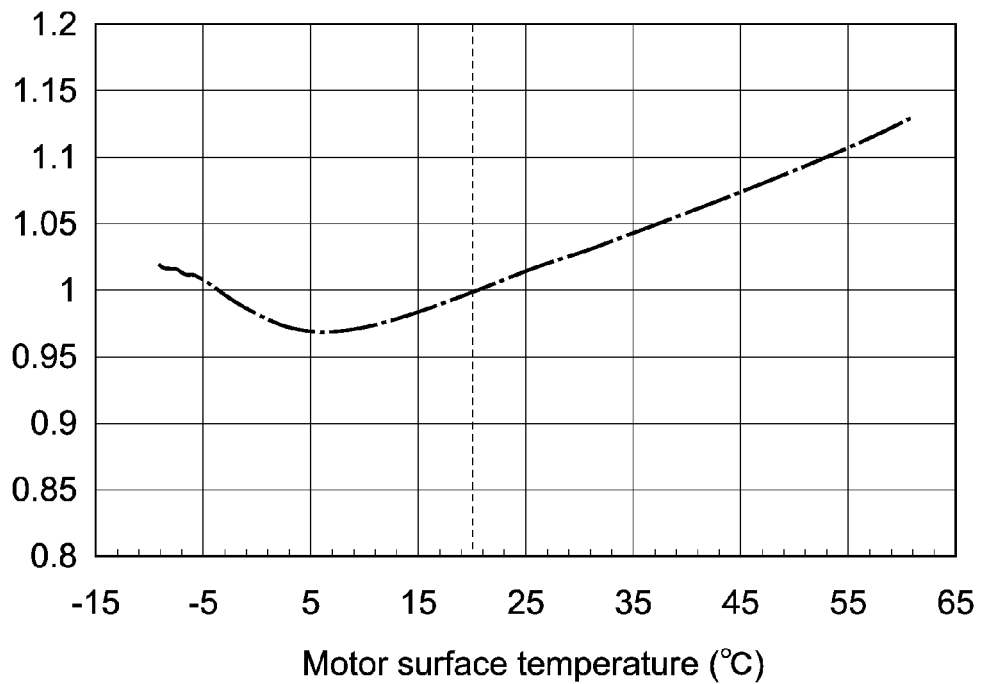
FIG. 10 A view showing an evaluation result of a change in motor rotation speed for explaining a method of deriving a correction coefficient.
Figure 11:
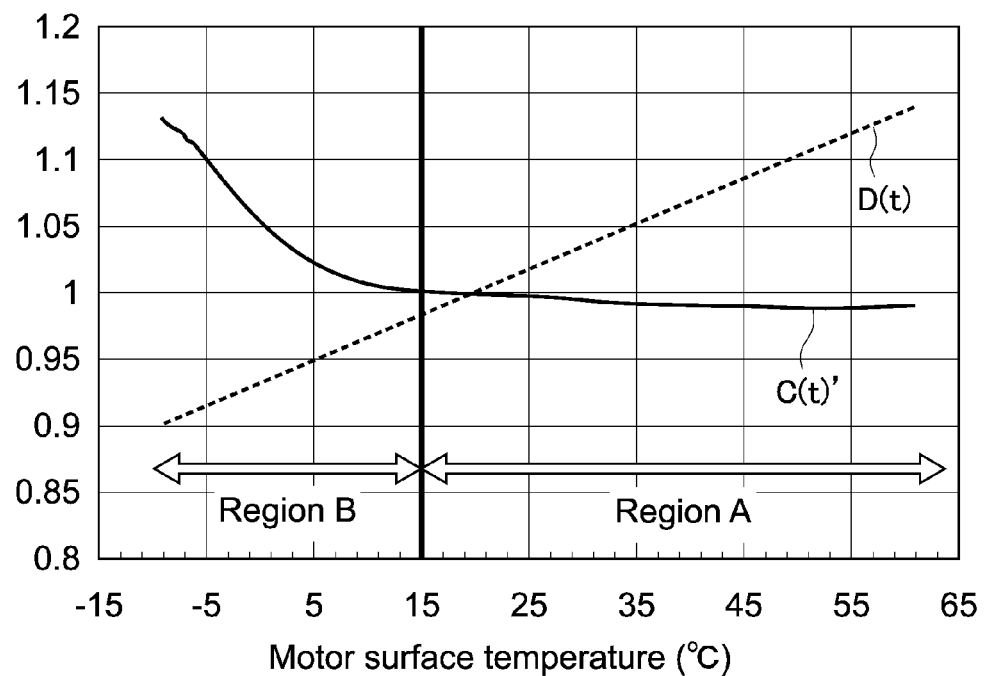
FIG. 11 A view showing an evaluation result of a change in motor rotation speed for explaining the method of deriving a correction coefficient.
Figure 12:
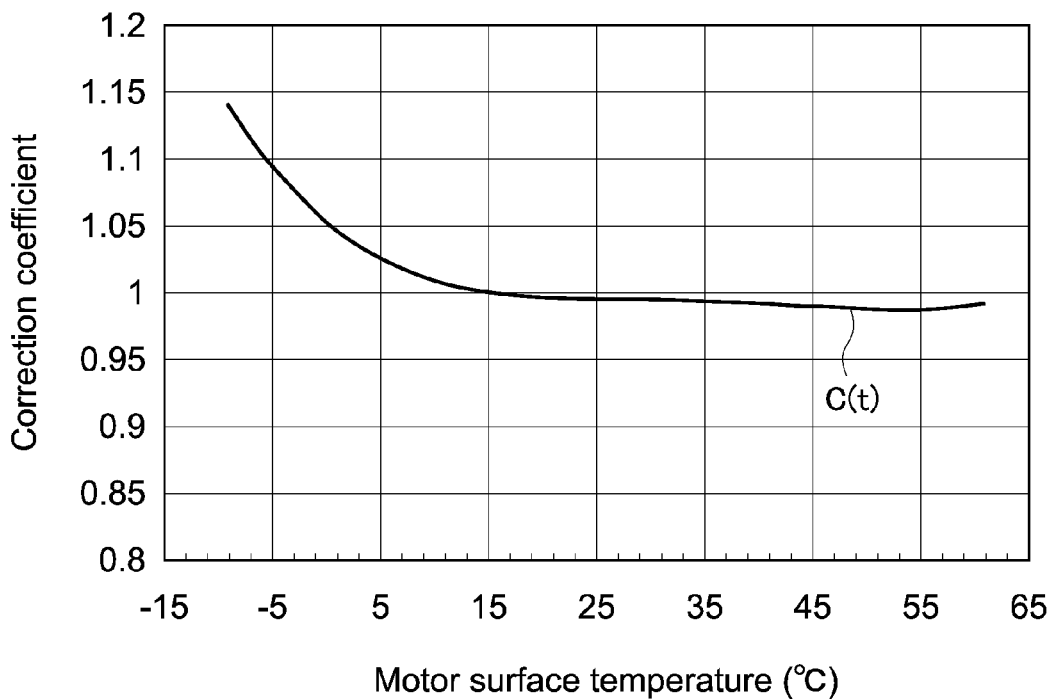
FIG. 12 A view showing an approximation function used as the correction coefficient.

The correction coefficient C(t) is, for example, an approximation function of the temperature characteristics when the motor surface temperature is from −10° C. (first temperature) to 60° C. (second temperature). Now, a method of deriving the correction coefficient C(t) will be described. First, rotation speed characteristics shown in FIG. 9 are standardized with a rotation speed when the motor surface temperature is 20° C. being a reference as shown in FIG. 10. Next, a temperature function C(t)' of the rotation speed is determined by dividing the standardized rotation speed characteristics by the density change amount D(t) as shown in FIG. 11. Then, as shown in FIG. 12, an approximation of the function C(t)' is calculated and it is set as the correction coefficient C(t). Although the correction coefficient C(t) is determined by the fifth-order approximation in this case, the approximation order is not limited thereto.

By using the thus derived correction coefficient C(t) to calculate the actual flow rate $Q_T$, it is possible to generate the correction signal (Vsp') for increasing the rotation speed of the motor 21 toward the theological value in the region B of, for example, −10° C. or more and 15° C. (third temperature) or less. With this, the flow rate characteristics of the gas at a temperature of from −10° C. to 15° C. can be made corresponding to the flow rate characteristics of the gas at a temperature of from 15° C. to 60° C. and a linear correlation can be obtained between the flow rate and the rotation speed in the temperature range of from −10° C. to 60° C. and a stable flow rate control can be realized.

Figure 13:
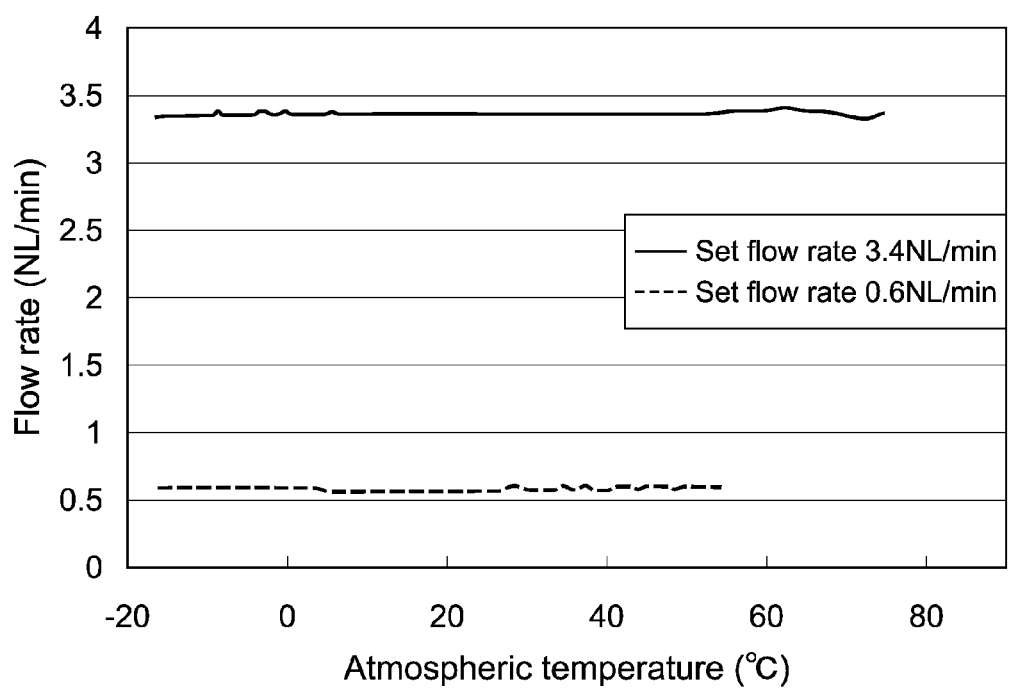
FIG. 13 An experimental result explaining actions of the pump device.

For example, FIG. 13 is a result of an experiment when an operation test of the pump device 3 according to this embodiment is performed. In the experiment, the flow rate when the atmospheric temperature was slowly lowered while discharging gas having a set flow rate (3.4 NL/min and 0.6 NL/min) was measured by the flowmeter. As shown in the figure, the pump can be stably operated at each of the set flow rate irrespective of the atmospheric temperature. Note that an error in flow rate at the set flow rate 3.4 NL/min was ±2% (0.07 NL/min) and an error in flow rate at the set flow rate 0.6 NL/min was ±5% (0.03 NL/min).

The correction coefficient C(t) is stored in the memory 56 as the temperature characteristics of the pump device 3. The correction coefficient C(t) may be individually set for each pump device or the common correction coefficient C(t) may be set for a plurality of pump devices.

The temperature range of the correction coefficient C(t) is not limited to the above-mentioned example and can be set to an appropriate temperature range in accordance with a use condition of the pump device.

The correction coefficient C(t) may include not only the above-mentioned temperature characteristics of the pump main body but also other parameters. For example, a parameter for correcting an individual difference of the pump main body may be included in the correction coefficient C(t). Regarding variations in the pump main body, due to the size of the parts of the pump and the variation in assembly accuracy, a variation in suction flow rate at the same rotation speed may be generated in, for example, a range of ±5%. Therefore, the individual difference of the pump main body results in a difference in suction flow rate per one rotation. Thus, a pump (reference pump) to be a reference is determined, a flow ratio of each pump and the reference pump is calculated, and the obtained value is added to the correction coefficient C(t). With this, a change in flow rate due to a variation in individual difference can be suppressed.

Alternatively, a parameter for correcting a change of the pump over time may be included in the correction coefficient C(t). For example, if the hardness of the diaphragm, valve (discharge valve, suction valve), or the like is changed in long-term operation, the flow rate is sometimes changed. Therefore, the flow ratio that changes over time is determined from long-term evaluation results and the obtained value is added to the correction coefficient C(t). With this, a change in flow rate in long-term operation of the pump device is suppressed and a predetermined set flow rate can be stably provided.

Second Embodiment

Figure 14:
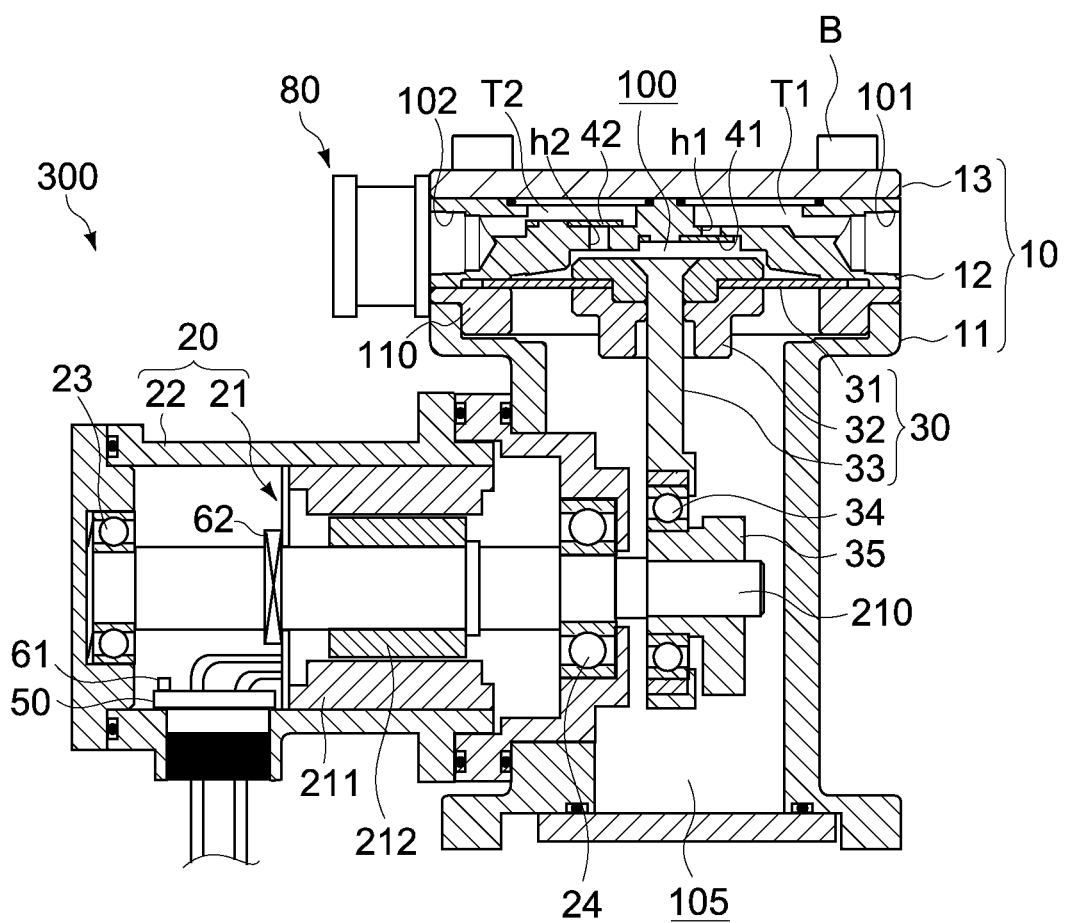
FIG. 14 A longitudinal cross-sectional view showing a configuration of a pump device according to a second embodiment of the present invention.

FIG. 14 is a cross-sectional view showing a structure of the pump device according to a second embodiment of the present invention. Hereinafter, configurations different from those of the first embodiment will be mainly described and the same configurations as those of the above-mentioned embodiment will be denoted by the same reference symbols and descriptions thereof will be omitted or simplified.

A pump device 300 according to this embodiment has a configuration in which a valve mechanism 80 (third valve) is added to the pump device 3 described in the first embodiment. The pump device 300 is applied to the pump system 1 shown in FIG. 1 as in the first embodiment and the drive thereof is controlled by the control section 5.

Figure 15:
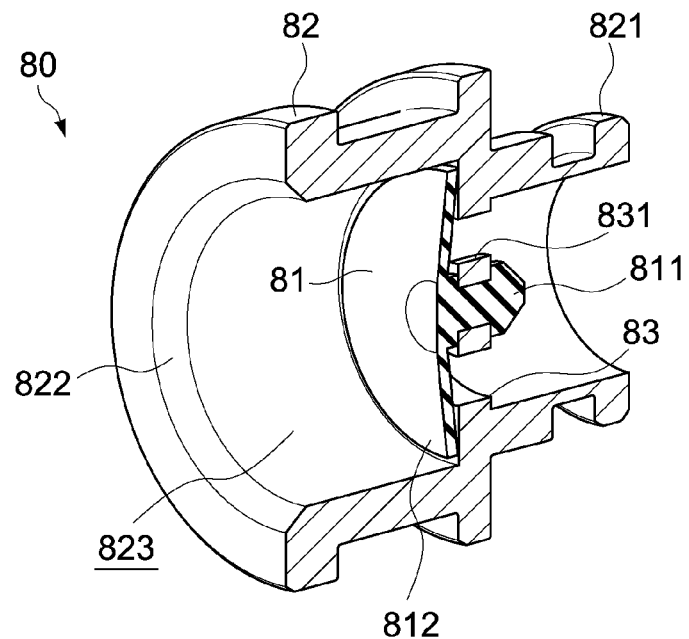
FIG. 15 A cross-sectional perspective view showing a configuration of a valve mechanism applied to the pump device.
Figure 16:
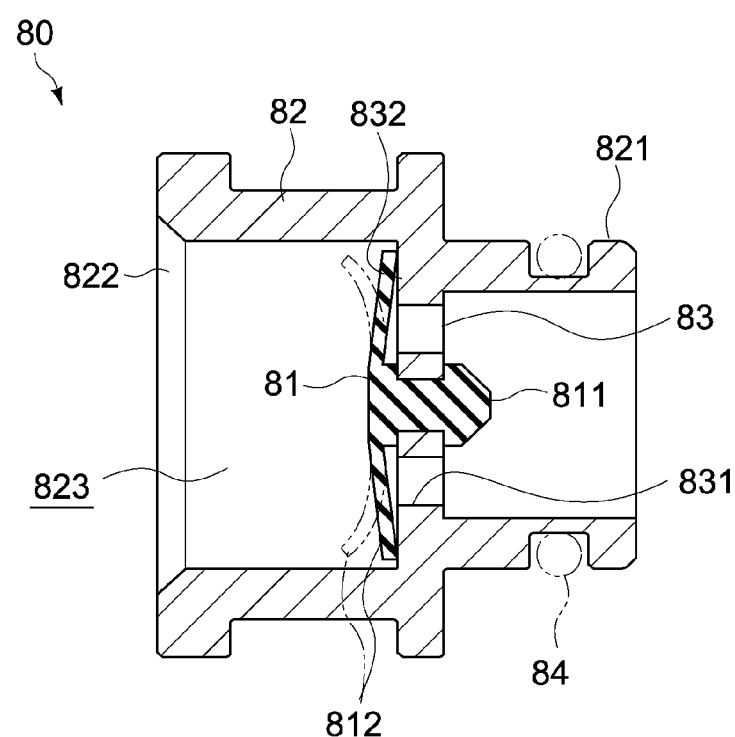
FIG. 16 A longitudinal cross-sectional view of the valve mechanism.

The valve mechanism 80 is attached to the suction port 102 and has a function of limiting gas flowing out of the suction port 102 of the gas during the stop of operation of the pump device 3. FIG. 15 shows a cross-sectional perspective view showing a configuration of the valve mechanism 80 and FIG. 16 shows a cross-sectional view thereof. The valve mechanism 80 includes a valve member 81 made of rubber and a housing 82 made of metal that houses the valve member 81.

The housing 82 includes an inlet end portion 821 connected to the suction port 102 of the casing 10 and an outlet end portion 822 connected to a channel (not shown) that communicates with the processing section 4. A seal ring 84 is fitted onto the inlet end portion 821. The inlet end portion 821 is hermetically fitted into the suction port 102 through the seal ring 84.

An inner path 823 that communicates between the inlet end portion 821 and the outlet end portion 822 is formed within the housing 82. Almost in a middle portion of the inner path 823, a wall portion 83 having a plurality of holes 831 at a center portion and around it is formed vertically to a wall surface of the inner path 823. A communication between the inlet end portion 821 and the outlet end portion 822 can be established via the holes 831.

The valve member 81 is formed of an umbrella valve. Specifically, the valve member 81 is formed in an almost disk shape and a shaft portion 811 formed at the center portion thereof is fitted into a center hole of the wall portion 83 and is arranged in the inner path 823. A circumferential portion 812 of the valve member 81 is elastically in contact with a seat 832 formed in a surface of the wall portion 83 facing the outlet end portion 822 and prevents a fluid from flowing from the outlet end portion 822 to the inlet end portion 821. That is, the valve member 81 functions as a non-return valve.

On the other hand, the valve member 81 is opened against a forward flow of fluid from the inlet end portion 821 to the outlet end portion 822 at a predetermined pressure or higher, and permits the flow of the fluid. In this case, the valve member 81 is separated from the seat 832 by the circumferential portion 812 being elastically deformed to the outlet end portion 822 as shown in FIG. 16 and a blocked state of the inner path 823 by the valve member 81 is released. Further, the valve member 81 can continuously change the suction flow rate by configuring the opening degree to be continuously changed according to a suction gas pressure from the suction port 102, which is equal to or higher than the first pressure and equal to or lower than the second pressure. Under a fluid pressure lower than the predetermined pressure, the circumferential portion 812 is seated on the seat 832 and the blocked state of the inner path 823 is kept.

A rubber material having a resistance against various kinds of process gas is used for the valve member 81. For example, in the case where methane, propane, or the like is used for process gas, a nitrile rubber (NBR), a hydrogenated nitrile rubber (HNBR), or a fluoro rubber (FKM) is used and the thickness and size of the valve member is not particularly limited and are set to thickness and size that can ensure a valve-opening pressure that can correspond to various specifications. The valve member 81 is not limited to the umbrella valve and may be constituted of a valve in another form such as a lead valve and a butterfly valve.

Specifically, the valve-opening pressure of the valve member 81 (minimum pressure necessary to open valve member 81) is set to a pressure at least higher than the valve-opening pressure (first pressure) of the suction valve 42. Then, the valve member 81 limits a flow of the gas having a pressure lower than a predetermined pressure (second pressure) higher than the valve-opening pressure.

The valve-opening pressure of the valve member 81 is determined referring to a gas pressure P1 provided from the pressure source 2 of the pump system 1. In this embodiment, the valve-opening pressure of the valve member 81 is set to a pressure higher than the gas pressure P1 of the pressure source 2. With this, even if the gas pressure P1 of the pressure source 2 is higher than the valve-opening pressure of the suction valve 42, a flow of the gas from the suction port 102 to the processing section 4 during the stop of operation of the pump device 300 is blocked and the gas can be reliably prevented from flowing out to the processing section 4.

Third Embodiment

Next, a third embodiment of the present invention will be described. Hereinafter, configurations different from those of the first embodiment will be mainly described and the same configurations as those of the above-mentioned embodiment will be denoted by the same reference symbols and descriptions thereof will be omitted or simplified.

Figure 17:
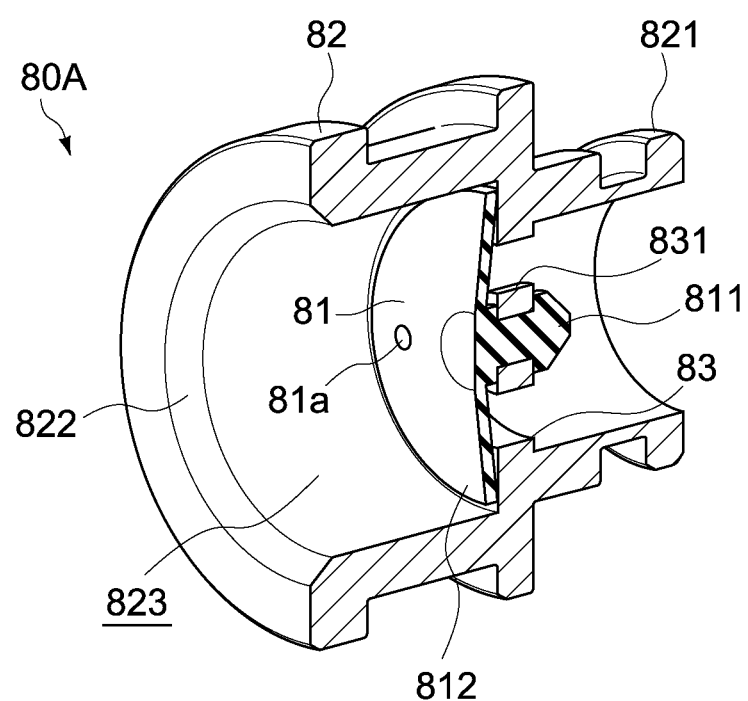
FIG. 17 A cross-sectional perspective view showing a configuration of a valve mechanism applied to a pump device according to a third embodiment of the present invention.

FIG. 17 is a cross-sectional perspective view showing a configuration of a valve mechanism 80A applied to the pump device according to this embodiment. The pump device according to this embodiment is applied to the pump system 1 shown in FIG. 1 as in the first embodiment and the drive thereof is controlled by the control section 5.

The valve mechanism 80A (third valve) in this embodiment is different from the configuration of the valve mechanism 80 in the above-mentioned second embodiment in that a through-hole 81a that provides a communication between the inlet end portion 821 and the outlet end portion 822 is formed in the valve member 81. That is, even if the pressure of the gas that is discharged from the suction port 102 and input into the inlet end portion 821 is smaller than the valve-opening pressure of the valve member 81, a valve mechanism 81A according to this embodiment is configured to flow out to the processing section 4 via the through-hole 81a while limiting the gas to a predetermined flow rate (e.g., 0.1 to 0.5 NL/min) or less. In this embodiment, for example, it is applied to a system in which it is necessary to supply the gas at a predetermined flow rate to the processing section 4 even during the stop of operation of the pump device.

Figure 18A:
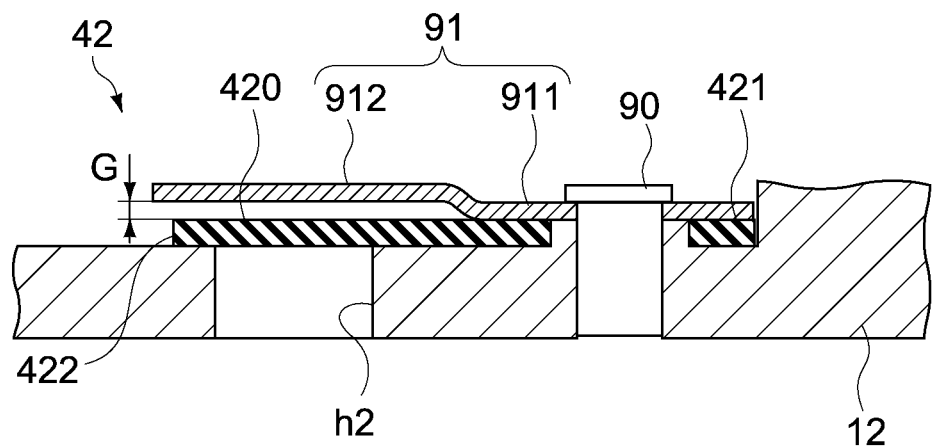
Figure 18B:
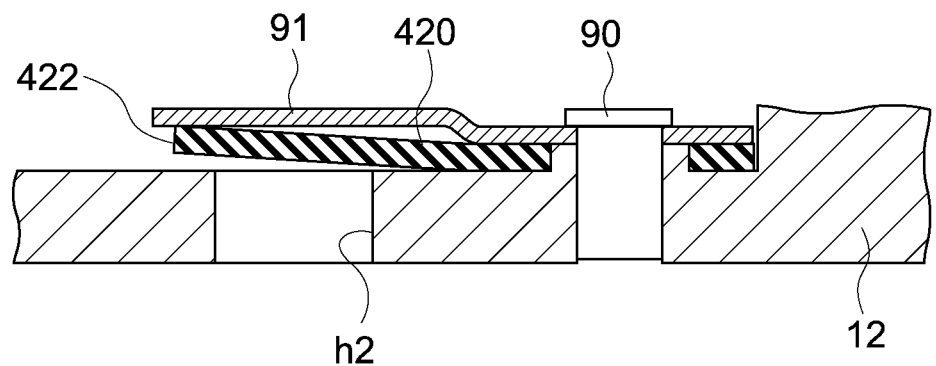

FIGS. 18A and 18B are main-part cross sectional views showing the suction valve 42 to which the pump device according to this embodiment is applied and structures around it. The suction valve 42 is attached to the pump head 12 to close the suction hole h2 that forms the suction passage T2 (FIG. 2).

The suction valve 42 includes a valve body 420 of a reed valve type and a regulating member 91 that regulates a valve-opening amount of the valve body 420.

The valve body 420 includes a first end portion 421 fixed to the pump head 12 and a second end portion 422 being a free end on an opposite side. When the pressure of the pump chamber 100 is lower than the first pressure, the second end portion 422 is seated on a pump head 120 to keep the suction hole h2 in the close state. On the other hand, if the pressure in the pump chamber 100 is equal to or higher than the first pressure, the second end portion 422 of the valve member 420 is moved up in the figure, following a flow of the gas passing through the suction hole h2, to open the suction hole h2.

The regulating member 91 is formed of a press-molded body of a metal plate or the like. The regulating member 91 includes a fixed portion 911 fixed to the pump head 12 and a regulating portion 912 opposed to the second end portion 422 of the valve body 420. The fixed portion 911 is fixed to the pump head 12 via a fixture 90 together with the first end portion 421 of the valve body 420. The regulating portion 912 is formed in a plate shape parallel to the valve body 420 and opposed to the valve body 420 with a predetermined gap G1 therebetween. The gap G1 is adjusted depending on a height of the folded portion of the regulating portion 912 with respect to the fixed portion 911. As shown in FIG. 18B, the regulating member 91 limits the amount of movement (valve-opening amount) of the valve body 420 to a size of the gap G1, using the regulating portion 912.

Figure 19A:
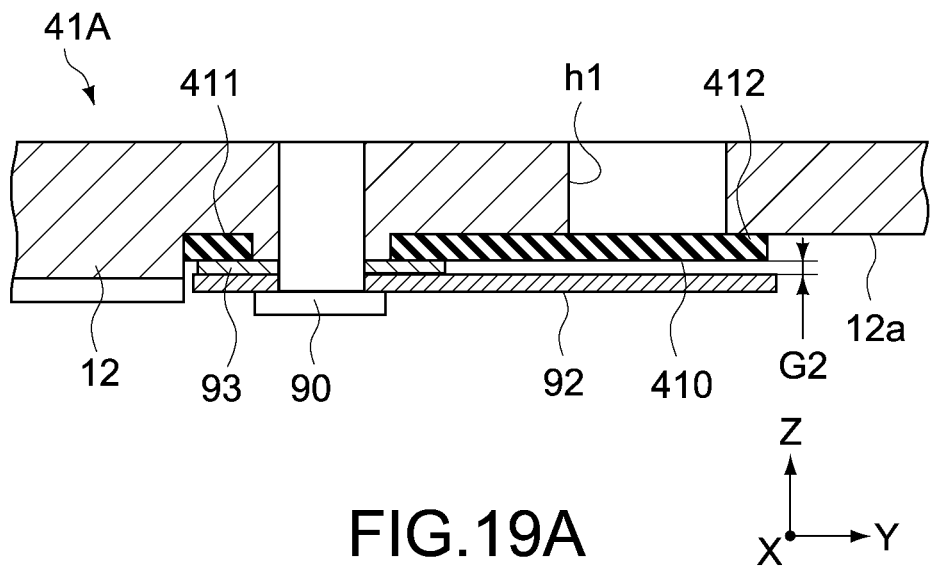
FIGS. 19A and 19B Main-part longitudinal cross-sectional views each showing a configuration example of a discharge valve of the pump device.
Figure 19B:
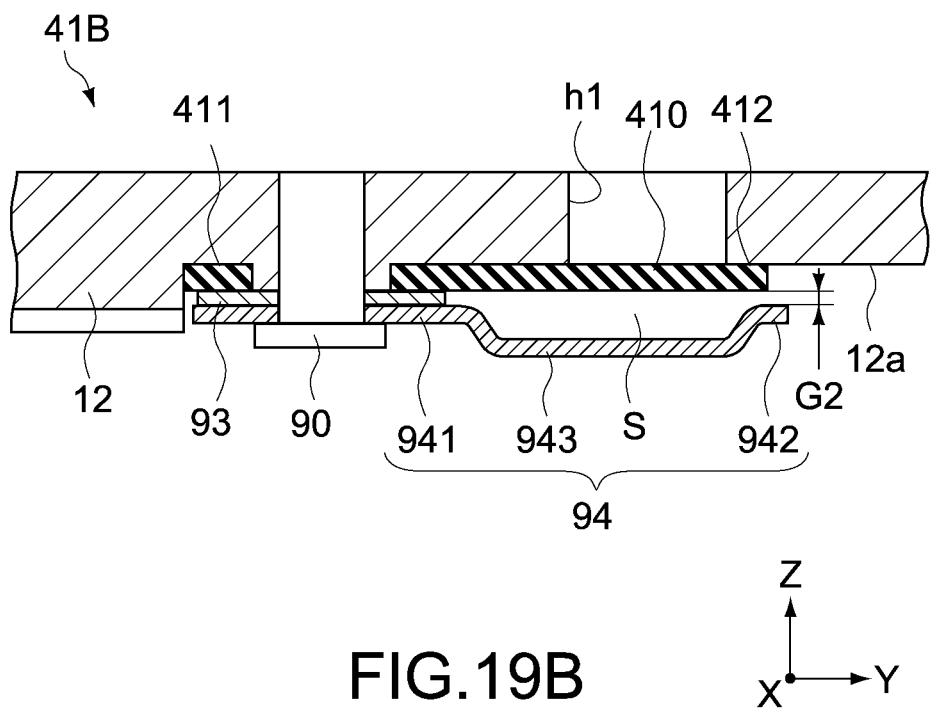

The discharge valve 41 is also configured in the same manner as the suction valve 42 described above. FIGS. 19A and 19B show configuration examples of the discharge valve 41.

A discharge valve 41A shown in FIG. 19A includes a valve body 410 of a reed valve type and a regulating member 92. The valve body 410 includes a first end portion 410 fixed to the pump head 12 and a second end portion 412 being a free end on an opposite side. The regulating member 92 is formed of a metal plate having almost the same length as that of the valve body 410 and opposed to the valve body 410 with a predetermined gap G2 therebetween. The size of the gap G2 is adjusted to a thickness of a spacer 93 provided between the valve body 410 and the regulating member 92. The regulating member 92 limits the amount of movement (valve-opening amount) of the valve body 410 to a size of the gap G2.

The regulating member 92 and the spacer 93 are integrally fixed to the pump head 12 via the fixture 90 and the spacer 93 also has a function of fixing a first end portion 411 of the valve member 410 to the pump head 12. In particular, in order to ensure the volume of the pump chamber 100, the discharge valve 42A is placed in a counter-bore 12a having a predetermined depth, which is formed in the pump head 12.

A discharge valve 41B shown in FIG. 19B includes the valve body 410 and a regulating member 94 as in the discharge valve 41A. The regulating member 94 is formed of a press-molded body of a metal plate or the like. The regulating member 94 includes a fixing portion 941 fixed on the pump head 12, a regulating portion 942 opposed to the second end portion 412 of the valve body 410, and a structural portion 943 formed between the fixing portion 941 and the regulating portion 942. The regulating portion 942 is opposed to the valve body 410 with a predetermined gap G2 therebetween. Both side portions of the structural portion 943, which are opposed in a short side direction (X-axis direction) orthogonal to a long side direction (Y-axis direction), are opened. A space portion S having a predetermined height larger than the gap G2 in a thickness direction (Z-axis direction) is formed. The size of the gap G2 is adjusted to have a thickness of the spacer 93 placed between the valve body 410 and the regulating member 92. The regulating member 92 limits the amount of movement (valve-opening amount) of the valve body 410 to a size of the gap G2.

Also in this example, the regulating member 94 and the spacer 93 are integrally fixed to the pump head 12 via the fixture 90 and the spacer 94 also has a function of fixing the first end portion 411 of the valve member 410 to the pump head 12. In order to ensure the volume of the pump chamber 100, the discharge valve 42B is placed in the counter-bore 12a having a predetermined depth, which is formed in the pump head 12. In the example, the regulating portion 942 of the regulating member 94 is opened at both side portions thereof, and hence it is possible to efficiently guide the gas suctioned from the discharge port h1 to an outside of the regulating member 94.

In addition, the regulating member 94 includes the structural portion 943 having the above-mentioned configuration, and hence, in a state in which a leading end of the valve body 410 is in contact with the regulating portion 942, a middle portion of the valve body 410 can be deformed to enter the space portion S. With this, the flow of the gas is further promoted and stable flow rate characteristics can be obtained also in a high-flow rate region (high-r.p.m. region).

Although the sizes of the gaps G1 and G2 are not particularly limited, the sizes are set such that the valve bodies 410 and 420 can open and close the suction holes h1 and h2 following reciprocations of the movable member 30. For example, the sizes are set to 0.1 mm to 1 mm.

A rubber material having a resistance against various kinds of process gas is used for the valve bodies 410 and 420. For example, in the case where methane, propane, or the like is used for process gas, a nitrile rubber (NBR), a hydrogenated nitrile rubber (HNBR), or a fluoro rubber (FKM) is used and the thickness and size of methane, propane, or the like are not particularly limited and are set to thickness and size that can ensure a valve-opening pressure that can correspond to various specifications.

As the regulating member 91 constituting the suction valve 42, the regulating member 92, 94 constituting the discharge valve 41 (41A, 41B) may be used. As the regulating member 92, 94 constituting the discharge valve 41 (41A, 41B), the regulating member 91 constituting the suction valve 42 may be used. Further, the suction valve 42 and the discharge valve 41 including the regulating members 91, 92, and 94 are applicable also to the first and second embodiments described above.

In the thus configured pump device according to this embodiment, the regulating member 91 that regulates the valve-opening amount of the valve body is provided in each of the discharge valve 41 and the suction valve 42. Therefore, it is possible to ensure a stable sealing property and a favorable followability and at the same time to realize suitable open and close operations of the valves 41 and 42. With this, it is possible to stably discharge the gas at the flow rate according to the driving r.p.m. of the motor 21 and to obtain linear flow rate characteristics in a high-r.p.m. region.

Figure 20:
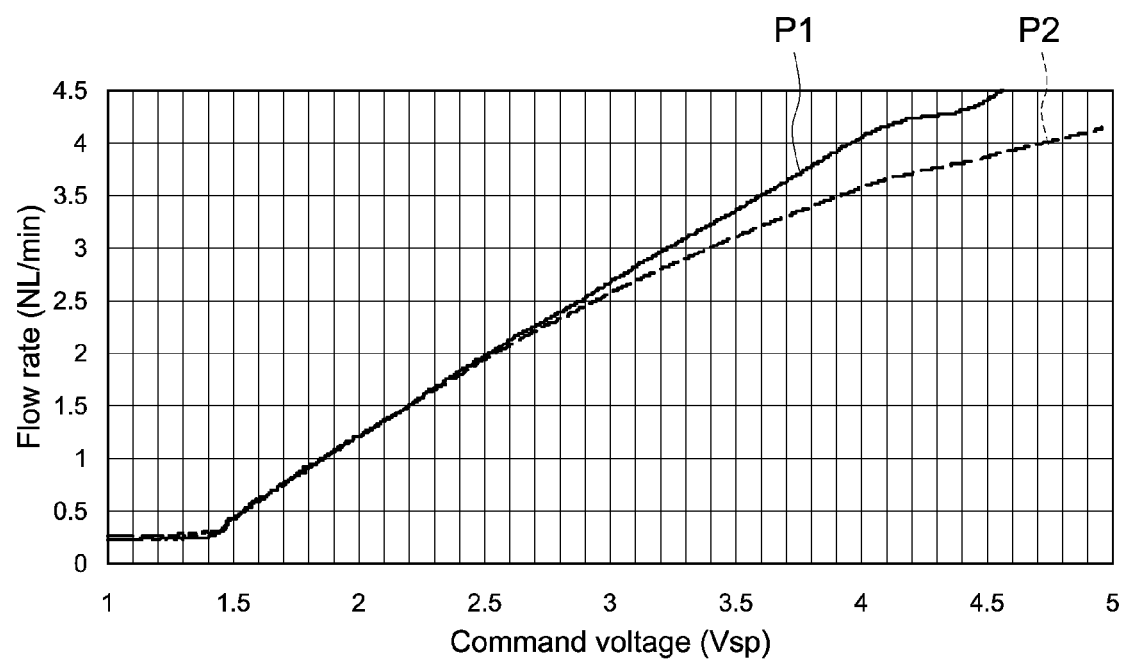
FIG. 20 An experimental result showing flow rate characteristics of the pump device in comparison with flow rate characteristics of a pump device according to a comparison example.

FIG. 20 is an experimental result showing flow rate characteristics (P1) of the pump device according to this embodiment including the discharge valve and the suction valve including the regulating members 91, 92, and 94 having the above-mentioned configurations and flow rate characteristics (P2) of the pump device according to a comparison example not including the regulating member in a comparison with each other. In FIG. 20, a horizontal axis shows a command voltage output from the control section 5 to the motor 21 and corresponds to the r.p.m. of the motor 21.

As shown in FIG. 20, in the pump device according to the comparison example, the linearity decreases as the r.p.m. increases and a variation of the suction flow rate in the low-flow rate region (low-r.p.m. region) was found. It is considered that this is because, with the valve structure in which only one end portion of the valve body is merely fixed, the valve-opening amount of the valve body is not limited, and hence a variation in sealing property is caused or the followability according to a change in pressure in the pump chamber is lowered. Thus, in the pump device according to the comparison example, it is sometimes difficult to deliver the gas at a stable flow rate.

In contrast, in the pump device according to this embodiment, it can be seen that the linearity is higher in the high-r.p.m. region than in the comparison example. Further, it was confirmed that a stable flow rate was obtained even in the low-flow rate region in comparison with the comparison example. It is considered that this is because a stable sealing property and an improved followability are achieved by regulating the valve-opening amount of the valve body by the regulating member. As described above, according to this embodiment, it is possible to ensure a stable suction flow rate in the low-flow rate region and the high-flow rate region and control the flow rate at a high accuracy.

Although the embodiments of the present invention have been described above, the present invention is not limited only to the above-mentioned embodiments and various changes may be added without departing from the gist of the present invention, of course.

For example, although, in the above-mentioned embodiments, the example in which the fuel gas is applied to the booster blower that performs discharging at a certain flow rate has been described as the pump device, the present invention may also be applied to a blower that discharges cathode gas (atmosphere or oxygen) at a certain flow rate in the same fuel cell system may also be applied alternatively or additionally. Also in this example, the density of oxygen changes depending on the atmospheric temperature, and hence it is possible to stably supply oxygen at the set flow rate using the above-mentioned temperature correction formula (Expression (3)).

In the above-mentioned example, a parameter for correcting the error in flow rate due to the change in atmospheric pressure may be added to the correction coefficient C(t). That is, the air density changes according to a change in atmospheric pressure depending on the place where the pump is used or the weather. The suction flow rate is changed even at the same rotation speed of the pump. Therefore, a flow ratio with, for example, 1 atm. ($1.01325*10^5$ Pa) being a reference is determined according to the gas density change expression based on an atmospheric difference in advance, and this is added to the correction coefficient C(t). With this, it is possible to stably provide a stable flow rate irrespective of the change in atmospheric pressure.

Further, although, in the above-mentioned embodiments, the change in gas density is calculated considering the temperature of the drive unit 20 (motor surface temperature) as the temperature of the gas, a measurement site of the pump main body is not limited to the drive unit 20 and may be, for example, the temperature of the surface or the inside of the casing 10. Alternatively, the temperature sensor may be attached to the pump head 12 and the temperature measured at a site near the gas may be output. In addition, the temperature of the suction gas may be directly measured. In this case, for example, the temperature sensor may be placed in the suction port 102.

Further, the controller 50 is not limited to the example in which it is attached to the pump main body and may be placed outside the pump main body. For example, the controller 50 may be placed on a control substrate of the pump system. In this case, the motor 21, the temperature sensor 61, the rotation sensor 62, and the like are electrically connected in a wired manner or in a wireless manner. The control substrate may be a structural substrate of the control section 5 or may be a substrate different from the control section 5.

In addition, although, in the above-mentioned embodiments, the pump device is constituted of the diaphragm pump, it is not limited thereto and the present invention is also applicable to other pump devices such as a roots pump. In the case of the roots pump, rotors provided to be opposed to each other correspond to the movable member that changes the volume of the pump chamber.

DESCRIPTION OF REFERENCE NUMERALS

3 . . . pump device
10 . . . casing

20 ... drive unit
30 ... movable member
31 ... diaphragm
41 ... discharge valve
42 ... suction valve
50 ... controller
61 ... temperature sensor
80 ... valve mechanism
91, 92, 94 ... regulating member
100 ... pump chamber
101 ... discharge port
102 ... suction port

The invention claimed is:

1. A pump device, comprising:
a pump main body including
a discharge port,
a suction port,
a pump chamber that is communicable with each of the discharge port and the suction port,
a movable member that alternately suctions gas into the pump chamber and discharges gas from the pump chamber, and
a drive unit including a motor that drives the movable member and is capable of changing a flow rate of gas discharged from the discharge port according to a rotation speed;
a temperature sensor that is attached to the pump main body and measures a temperature of gas discharged from the discharge port or a temperature of the pump main body, to thereby output a temperature signal relating to a temperature of the gas; and
a controller including
an input terminal into which an external signal for specifying a reference flow rate of the gas discharged from the discharge port is input,
an arithmetic circuit that calculates, based on the temperature signal, an actual flow rate of the gas discharged from the discharge port, and
an output terminal that outputs a correction signal for correcting a rotation speed of the motor such that the actual flow rate equals the reference flow rate;
wherein the controller further includes a memory that stores a correction coefficient including a temperature characteristic of the pump main body, which are obtained in advance,
the arithmetic circuit calculates an actual flow rate of the gas by multiplying the correction coefficient with a gas flow rate calculated based on the temperature signal,
the correction coefficient is an approximation function of the temperature characteristic from a first temperature to a second temperature higher than the first temperature, and
the approximation function is used to generate a correction signal for increasing the rotation speed of the motor between the first temperature and a third temperature higher than the first temperature and lower than the second temperature.

2. The pump device according to claim 1, further comprising:
a first valve that is attached between the discharge port and the pump chamber and permits a flow of gas from the discharge port to the pump chamber,
a second valve that is attached between the pump chamber and the suction port and permits a flow of the gas from the pump chamber to the suction port when the pressure of gas in the pump chamber is a first pressure or higher, and
a third valve that is attached to the pump main body and limits a flow of the gas from the discharge port to the suction port when the pressure of gas between the discharge port and the suction port is equal to or lower than a second pressure higher than the first pressure.

3. The pump device according to claim 2, wherein
the third valve includes a valve member that continuously changes an opening degree according to a pressure equal to or higher than the first pressure and equal to or lower than the second pressure.

4. The pump device according to claim 3, wherein
the valve member includes a through-hole that performs a flow of gas having a flow rate equal to or lower than a predetermined flow rate when fully closed.

5. The pump device according to claim 2, wherein
the first valve and the second valve each include
a valve body including
a first end portion that is fixed to the pump main body, and
a second end portion that moves following a flow of the gas, and
a regulating member that is provided to be opposed to the valve body via
a gap and limits an amount of movement of the second end portion.

6. The pump device according to claim 1, wherein
the temperature sensor is attached to the drive unit.

7. The pump device according to claim 1, wherein
the temperature sensor is attached to the pump chamber.

8. The pump device according to claim 1, wherein
the pump main body is a diaphragm pump.

9. The pump device according to claim 1, wherein
the correction coefficient includes a parameter for correcting an error of a flow rate due to a change in atmospheric pressure.

10. A control method for a pump device, comprising:
outputting a drive signal for driving a motor at a rotation speed for discharging gas at a reference flow rate from the discharge port of the pump main body;
measuring a temperature of gas discharged from the discharge port or a temperature of the pump main body by a temperature sensor attached to the pump main body;
calculating, based on a temperature signal relating to the temperature of the gas, which is included in an output of the temperature sensor, an actual flow rate of the gas discharged from the discharge port; and
correcting the drive signal such that the actual flow rate equals the reference flow rate and outputting the corrected drive signal to the motor;
wherein the calculating the actual flow rate of the gas includes calculating the actual flow rate of the gas by multiplying a gas flow rate calculated based on the temperature signal by a correction coefficient including a temperature characteristic of the pump main body, which is obtained in advance;
the correction coefficient is an approximation function of the temperature characteristic from a first temperature to a second temperature higher than the first temperature, and
the approximation function is used to generate a correction signal for increasing a rotation speed of the motor between the first temperature and a third temperature higher than the first temperature and lower than the second temperature.

11. The control method for a pump device, according to claim 10, wherein the correction coefficient includes a parameter for correcting an error of the flow rate due to a change in atmospheric pressure.

\* \* \* \* \*